(12) United States Patent
Lee

(10) Patent No.: US 7,869,689 B2
(45) Date of Patent: Jan. 11, 2011

(54) APPARATUS AND METHOD FOR INTEGRATED SCHEDULED RECORDING IN MULTI-TUNER SYSTEM

(75) Inventor: Ju-yup Lee, Scongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1429 days.

(21) Appl. No.: 10/973,458

(22) Filed: Oct. 27, 2004

(65) Prior Publication Data
US 2006/0088287 A1    Apr. 27, 2006

(51) Int. Cl.
*H04N 5/91* (2006.01)
(52) U.S. Cl. .......................................... 386/83; 386/95
(58) Field of Classification Search ................... 386/46, 386/83, 95, 125; 455/42
See application file for complete search history.

(56) References Cited

U.S. PATENT DOCUMENTS

| | | | | |
|---|---|---|---|---|
| 5,353,121 A | * | 10/1994 | Young et al. | 725/52 |
| 5,828,945 A | * | 10/1998 | Klosterman | 455/42 |
| 6,003,041 A | * | 12/1999 | Wugofski | 1/1 |

FOREIGN PATENT DOCUMENTS

| | | |
|---|---|---|
| JP | 2002-165146 | 6/2002 |
| JP | 2002-218364 | 8/2002 |
| KR | 1999-0047525 | 7/1999 |
| WO | WO 92/22983 | * 12/1992 |

* cited by examiner

*Primary Examiner*—Huy T Nguyen
(74) *Attorney, Agent, or Firm*—Roylance, Abrams, Berdo and Goodman L.L.P.

(57) ABSTRACT

An apparatus and method are disclosed for setting scheduled recording of a plurality of standard broadcast signals received by a multi-tuner system on a single integrated scheduled recording setup graphical user interface (GUI) screen. The apparatus comprises a multi-tuner receiver for receiving a plurality of broadcast signals complying with different standards, a timer unit for providing timer information necessary for a plurality of tuners and scheduled recording of channels available in the tuners, and a graphic user interface (GUI) engine for integrally displaying information regarding tuners available for scheduled recording and channels available in the available tuners on a single screen in response to a user's input. The method comprises displaying an integrated scheduled recording setup graphic user interface (GUI) screen that provides respective fields for displaying a selected tuner, a selected channel available in the selected tuner at one time, and setting a scheduled recording by facilitating the inputting of necessary information for scheduled recordings by different tuners. Timer information necessary for scheduled recording is used in common on the integrated scheduled recording setup GUI screen regardless tuner type.

9 Claims, 4 Drawing Sheets

FIG. 1 (PRIOR ART)

SCHEDULED RECORDING SETUP SCREEN
100

| TIMER PROGRAM | | | | | | | |
|---|---|---|---|---|---|---|---|
| | PROGRAM | DATE | START TIME | END TIME | SPEED | TYPE | VIP |
| 01 | -- | --/-- | --:-- | --:-- | -- | -- | -- |
| 02 | -- | --/-- | --:-- | --:-- | -- | -- | -- |
| 03 | -- | --/-- | --:-- | --:-- | -- | -- | -- |
| 04 | -- | --/-- | --:-- | --:-- | -- | -- | -- |
| 05 | -- | --/-- | --:-- | --:-- | -- | -- | -- |
| 06 | -- | --/-- | --:-- | --:-- | -- | -- | -- |
| 07 | -- | --/-- | --:-- | --:-- | -- | -- | -- |
| 08 | -- | --/-- | --:-- | --:-- | -- | -- | -- |

INSTRUCTION — ENTER / MOVE — RETURN — MENU EXIT

SCHEDULED RECORDING SETUP SCREEN
200

| NUMBER | TUNER (210) | CHANNEL (220) | DATE (230) | START TIME (240) | END TIME (250) | SPEED (260) | FREQUENCY (270) |
|---|---|---|---|---|---|---|---|
| 01 | C | 7 | 08/01 | 5:00 | 07:00 | MAXIMUM | DAILY |
| 02 | | 69 | | 11:00 | | FAST | |
| 03 | | 103 | | 22:00 | | FAST | |
| 04 | | 34 | | 17:00 | | STANDARD | |
| 05 | | | | | | | |
| 06 | | | | | | | |
| 07 | | | | | | | |
| 08 | | | | | | | |

INSTRUCTION  ENTER / MOVe  RETURN  MENU EXIT

APPARATUS AND METHOD FOR INTEGRATED SCHEDULED RECORDING IN MULTI-TUNER SYSTEM

BACKGROUND OF THE INVENTION

1. Field of the Invention

The present invention relates to an apparatus and method for integrated scheduled recording in a multi-tuner system, and more particularly, to an apparatus and method for setting scheduled recording of a plurality of standard broadcast signals received by a multi-tuner system on a single integrated scheduled recording setup graphical user interface (GUI) screen.

2. Description of the Related Art

Recently, the amount of information or entertainment provided for customers has rapidly increased. Especially, the number of pieces of information and entertainment transmitted through satellites, cables, television (TV) networks, telephone networks, etc. in an analog or digital form has increased. In addition, the demand for a multi-tuner system that integrally receives many pieces of information including different types of broadcast signals, and functions as different types of tuners for satellite broadcasts, cable TV broadcasts, and so on, has increased. When the multi-tuner system functions as two or more different types of tuners, broadcast signals received using different types of tuners are displayed in different forms, respectively, as in a picture-in-picture (PIP) mode.

In a conventional multi-tuner system functioning as two or more different types of tuners, scheduled recording can be set for only one type of tuner at one time.

Referring to FIG. 1, a conventional multi-tuner system formed by integrating various products respectively having different broadcast standard tuners into a single digital complex product cannot set scheduled recording for channels available in different tuners on a scheduled recording setup screen 100 at one time.

Accordingly, an apparatus and method for integrated scheduled recording in a multi-tuner system, by which scheduled recording of broadcast signals received by different types of tuners for various satellite broadcasts and terrestrial broadcasts can be set in a single integrated scheduled recording GUI environment at one time, is desired.

SUMMARY OF THE INVENTION

The present invention provides an apparatus and method for integrated scheduled recording in a multi-tuner system, by which scheduled recording of a broadcast signal is set on a single integrated scheduled recording setup graphical user interface (GUI) screen, which displays information regarding different types of tuners for a plurality of broadcast standards and channels, regardless of whether the broadcast signal is received via a wireless or wireline communication link a wire and has an analog or digital format.

The present invention also provides an apparatus and method for integrated scheduled recording in a multi-tuner system, in which timer information received by a single tuner system is used as timer information necessary for scheduled recording and playback.

Consistent with an aspect of the present invention, there is provided an apparatus for integrated scheduled recording in a multi-tuner system. The apparatus includes a multi-tuner receiver for receiving a plurality of broadcast signals complying with different standards, a switching unit for selecting a tuner and a channel corresponding to a broadcast signal to be recorded through scheduled recording, a GUI engine for integrally displaying on a single screen the information regarding tuners available for the scheduled recording and channels available in the tuners, a display unit for displaying the plurality of broadcast signals, a user interface unit for receiving an input from a user, a timer unit for providing timer information necessary for the scheduled recording, a system memory unit storing scheduled recording information, and a storage device for storing a broadcast signal to be recorded through the scheduled recording.

Consistent with another aspect of the present invention, there is provided a method for integrated scheduled recording in a multi-tuner system. The method includes displaying a GUI screen for an integrated scheduled recording setup; and setting information including a tuner for scheduled recording, a channel to be recorded, and a recording date, time, speed and frequency on the GUI screen.

BRIEF DESCRIPTION OF THE DRAWINGS

The above and other features and advantages of the present invention will become more apparent by describing in detail preferred embodiments thereof with reference to the attached drawings in which:

FIG. 1 illustrates an example of a conventional scheduled recording setup graphical user interface (GUI) screen in a multi-tuner system;

DETAILED DESCRIPTION OF THE PREFERRED EMBODIMENT

The present invention will now be described more fully with reference to the accompanying drawings, in which exemplary embodiments of the invention are shown.

Figure 2:
FIG. 2 illustrates an integrated scheduled recording setup GUI screen in a multi-tuner system according to an embodiment of the present invention.

FIG. 2 illustrates an integrated scheduled recording setup GUI screen 200 in a multi-tuner system according to an embodiment of the present invention. Compared to a field structure on the conventional scheduled recording setup graphical user interface (GUI) 100 screen shown in FIG. 1, a field structure shown in FIG. 2 has the same layout. A scheduled recording setup screen 200 comprises a turner selection field 210, a channel selection field 220, a recording date setup field 230, a recording start time setup field 240, a recording end time setup field 250, a recording speed selection field 260, and a recording frequency selection field 270. The turner selection field 210 allows selection of at least one type of tuner among an analog tuner A, a set-top box (STB) digital tuner B, a terrestrial broadcast tuner C for video-on-demand (VOD), and a satellite broadcast tuner D, among others. The channel selection field 220 allows selection of at least one channel from among channels available in the selected tuner. When the turner selection field 210 and the channel selection field 220 are provided, scheduled recording of broadcast signals received by different broadcast standard tuners can be integrally set on a single integrated scheduled recording setup GUI screen, thereby maximizing a user's convenience.

Figure 3:
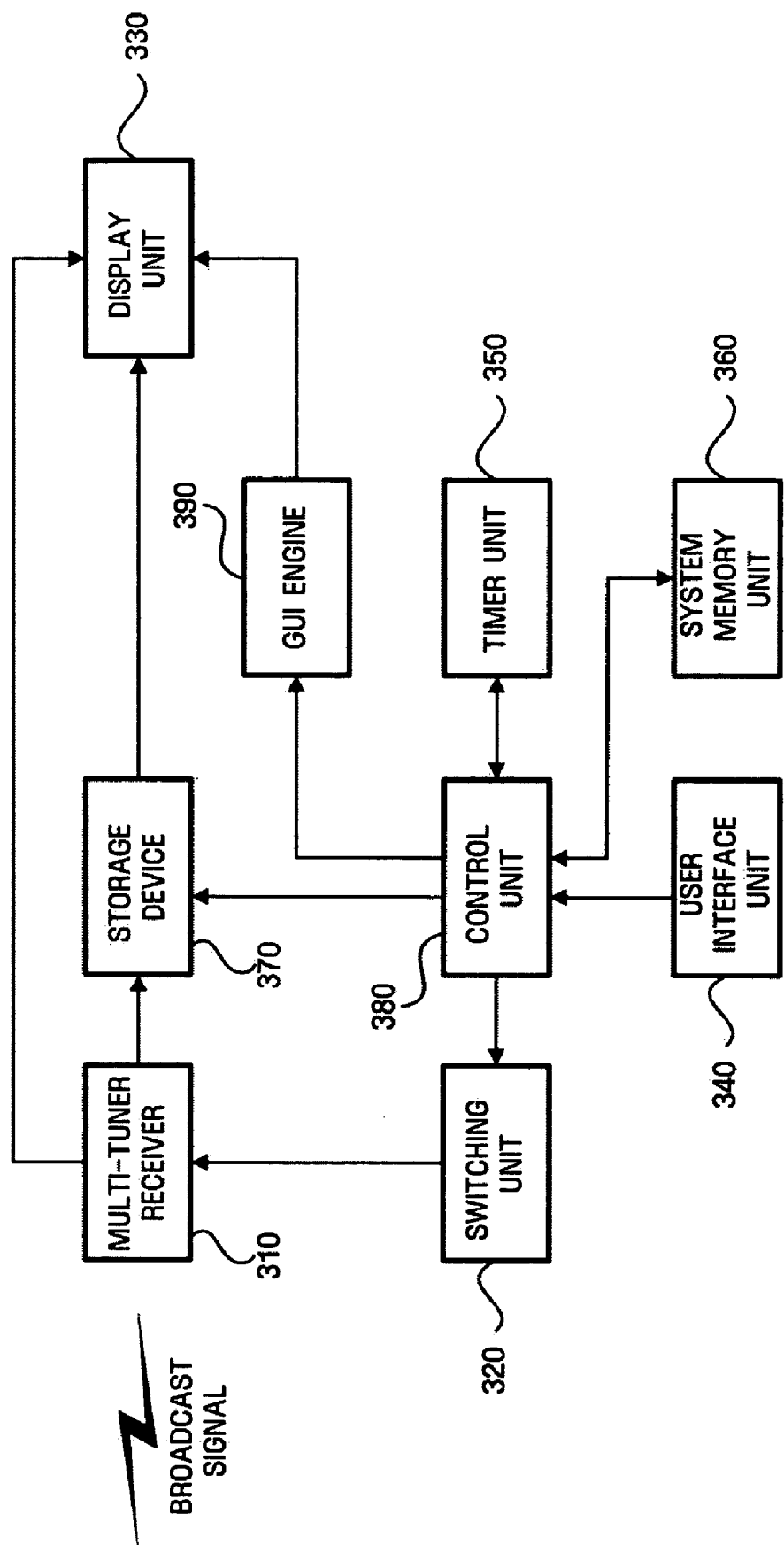
FIG. 3 is a schematic block diagram of an apparatus for setting scheduled recording using an integrated scheduled recording setup GUI screen according to an embodiment of the present invention.

FIG. 3 is a schematic block diagram of an apparatus for setting scheduled recording using an integrated scheduled recording setup GUI screen according to an embodiment of the present invention. As shown in FIG. 3, an apparatus for setting scheduled recording using an integrated scheduled recording setup GUI screen in a multi-tuner system according to an embodiment of the present invention includes a multi-tuner receiver 310 for receiving a plurality of broadcast signals complying with different standards, a switching unit 320 for selecting a tuner and a channel corresponding to a broadcast signal to be recorded through scheduled recording, a display unit 330 for displaying the plurality of broadcast signals complying with different standards, a user interface unit 340 for receiving an input from a user, a timer unit 350 for providing timer information necessary for scheduled recording, a system memory unit 360 for storing scheduled recording information, a storage device 370 for storing a broadcast signal to be recorded through the scheduled recording, a control unit 380, and a GUI engine 390 for integrally displaying information regarding tuners and channels available for the scheduled recording on a single screen.

In detail, the multi-tuner receiver 310 is single module including at least two tuners and receives broadcast signals complying with different standards such as used in satellite broadcasting, terrestrial broadcasting, wireless broadcasting, and wired broadcasting.

The switching unit 320 selects a tuner and a channel for scheduled recording according to a control signal of the control unit 380.

The display unit 330 displays the broadcast signals complying with the different standards and signals including information input through the user interface unit 340 during scheduled recording setup.

The user interface unit 340 recognizes instructions according to a user's manipulation on an input device (not shown) and outputs signals corresponding to the recognized instructions to the control unit 380.

The timer unit 350 provides timer information necessary for the scheduled recording setup. The timer information includes program information received in a channel of each tuner, and the start time and the end time of the program. The timer unit 350 shares and manages the timer information of each tuner, and provides the timer information, thereby simplifying the complexity of multi-tuner system.

The system memory unit 360 stores information regarding a tuner, channels available in the tuner, a recording date, a recording start time, a recording end time, a recording speed, a recording frequency, etc. that are input on the integrated scheduled recording setup GUI screen during the scheduled recording setup.

The storage device 370 stores a broadcast signal corresponding to a channel and a tuner that are selected during the scheduled recording setup.

The control unit 380 controls operations of the multi-tuner apparatus depicted in FIG. 3. The control unit 380 controls the display unit 330 through the GUI engine 390 to display information input to the user interface unit 340 and stores information set on the integrated scheduled recording setup GUI screen 200 in the system memory unit 360. In addition, the control unit 380 controls the switching unit 320 to select a tuner and a channel for scheduled recording.

Figure 4:
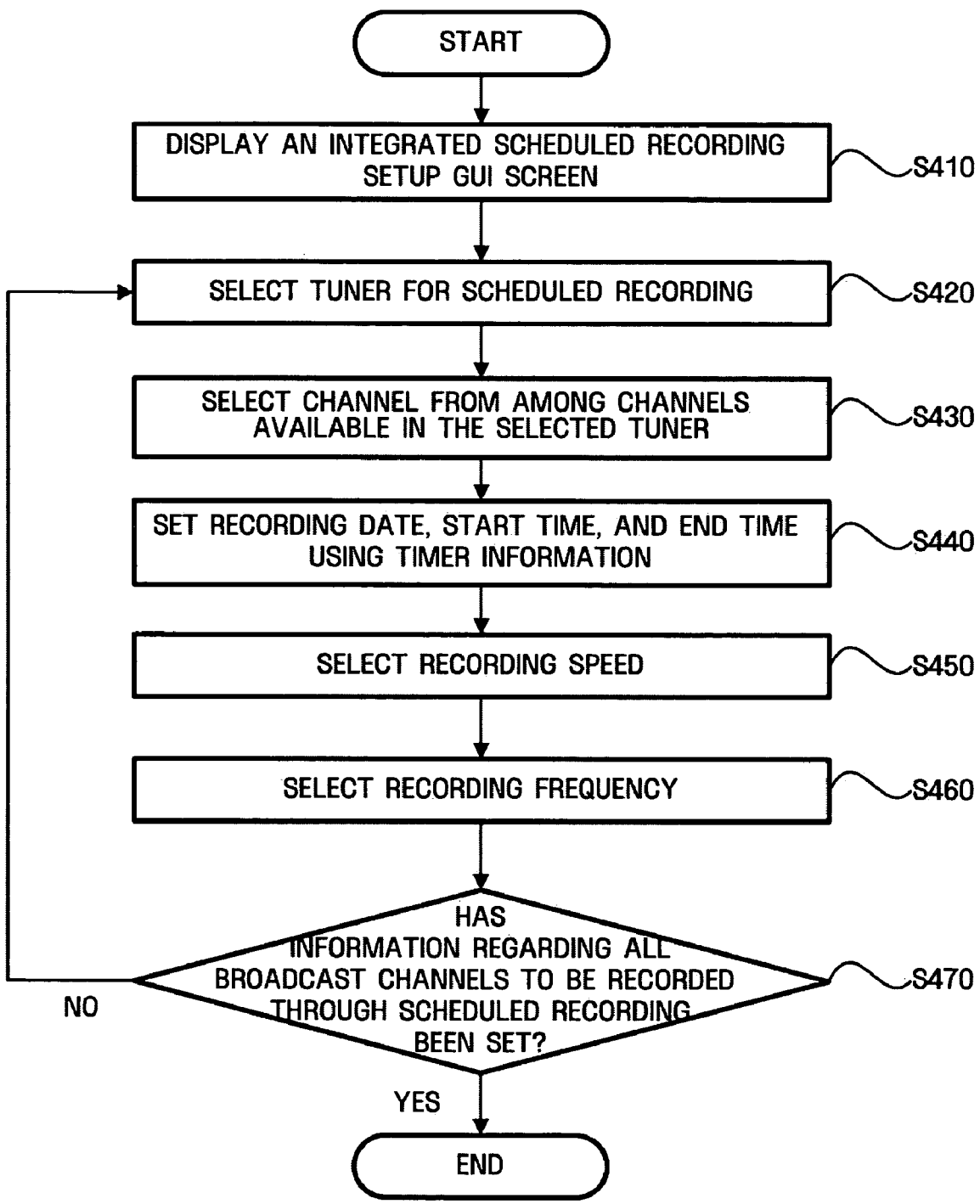
FIG. 4 is a flowchart of a method of setting scheduled recording using an integrated scheduled recording setup GUI screen according to an embodiment of the present invention.

FIG. 4 is a flowchart of a method of setting scheduled recording using an integrated scheduled recording setup GUI screen 200 according to an embodiment of the present invention. First, when the control unit 380 receives a scheduled recording setup input from the user interface unit 340, the display unit 330 displays the integrated scheduled recording setup GUI screen in operation S410.

Next, a tuner for scheduled recording is selected from among tuners available in the multi-tuner receiver 310 and stored for display in the tuner selection field 210 in operation S420. A channel to be recorded is selected from among channels available in the selected tuner and stored for display in the channel selection field 220 in operation S430. A recording date, start time and end time are set using timer information output from the timer unit 350 in operation S440 and stored, respectively, for display in fields 230, 240 and 250. A recording speed is selected and stored for display in the recording speed selection field 260 in operation S450. A recording frequency is selected and stored for display in the recording frequency selection field 270 in operation S460. Operations S420 through S460 are repeated until scheduled recording information regarding all desired broadcast channels is set in operation S470. As illustrated in FIG. 2, each scheduled receiver is preferably represented by a corresponding row on the screen 200.

According to the present invention, scheduled recordings for different tuners are not separately set on independent GUI screens but are set on a single integrated scheduled recording setup GUI screen in a multi-tuner system, thereby simplifying scheduled recording setup. As a result, a user's convenience is increased. In addition, timer information necessary for scheduled recording is used in common on the integrated scheduled recording setup GUI screen, thereby simplifying the multi-tuner system.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom. Therefore, the described embodiments are to be considered in all respects only as illustrative and not restrictive and the scope of the invention.

What is claimed is:

1. An apparatus for integrated scheduled recording in a multi-tuner system, the apparatus comprising:
   a multi-tuner receiver comprising a plurality of tuners for receiving a plurality of broadcast signals complying with different standards;
   a timer unit configured to receive program information for a channel of each of the plurality of tuners and to provide timer information for scheduled recording of channels available in the plurality of tuners; and
   a graphic user interface (GUI) engine for displaying, in response to a user's input, a scheduled recording setup screen comprising a tuner selection field for selecting from the plurality of tuners available for scheduled recording, a channel selection field for selecting from a plurality of channels available in the available tuners, a recording date setup field, and a recording time setup field.

2. The apparatus of claim 1, further comprising:
   a user interface unit for receiving the user's input; and
   a system memory unit for storing scheduled recording information comprising a selected tuner, channels available in the tuner, a recording date, a recording start time, a recording end time, a recording speed, and a recording frequency.

3. The apparatus of claim 2, further comprising a switching unit selecting for a tuner from among the plurality of tuners and a channel for scheduled recording.

4. The apparatus of claim 3, further comprising a control unit for controlling a display unit through the graphic user interface (GUI) engine to display information input to the user interface unit, for storing information set on an integrated scheduled recording setup GUI screen in the system memory unit, and for controlling the switching unit to select a tuner and a channel for scheduled recording.

5. A method for integrated scheduled recording in a multi-tuner system, the method comprising:
   displaying, in response to a user input, an integrated scheduled recording setup graphic user interface (GUI) screen that provides a scheduled recording setup screen comprising a tuner selection field, a channel selection field, a recording date setup field, and a recording time setup field; and setting scheduled recording by inputting necessary information.

6. The method of claim 5, further comprising:

selecting a type of a tuner for scheduled recording and a channel to be recorded from among channels available in the selected tuner; and setting a recording date, a recording start time, and a recording end time using timer information.

7. The method of claim 5, wherein the timer information is provided by a single tuner system for common use regardless of the type of the selected tuner.

8. The apparatus of claim 1, wherein the scheduled recording setup screen further comprises a recording start and end time setup filed, a recording speed selection field, and a recording frequency selection field.

9. The method of claim 5, further comprising:

displaying, in response to a user input, an integrated scheduled recording setup graphic user interface (GUI) screen that provides a scheduled recording setup screen comprising a recording start and end time setup field, a recording speed selection field, and a recording frequency selection field.

* * * * *